United States Patent
Wu et al.

(10) Patent No.: US 10,535,997 B2
(45) Date of Patent: Jan. 14, 2020

(54) REACTIVE POWER OVEREXCITATION REGULATION TECHNOLOGY FOR SYNCHRONOUS GENERATOR

(71) Applicants: NR Electric Co., Ltd, Jiangsu (CN); NR Engineering Co., Ltd, Jiangsu (CN)

(72) Inventors: Long Wu, Jiangsu (CN); Weiqun Liu, Jiangsu (CN); Xiangjian Shi, Jiangsu (CN)

(73) Assignees: NR ELECTRIC CO., LTD, Jiangsu (CN); NR ENGINEERING CO., LTD, Jiangsu (CN)

( * ) Notice: Subject to any disclaimer, the term of this patent is extended or adjusted under 35 U.S.C. 154(b) by 0 days.

(21) Appl. No.: 16/469,607

(22) PCT Filed: Apr. 23, 2018

(86) PCT No.: PCT/CN2018/084026
§ 371 (c)(1),
(2) Date: Jun. 13, 2019

(87) PCT Pub. No.: WO2018/161974
PCT Pub. Date: Sep. 13, 2018

(65) Prior Publication Data
US 2019/0334348 A1   Oct. 31, 2019

(30) Foreign Application Priority Data
Mar. 7, 2017 (CN) .......................... 2017 1 0130467

(51) Int. Cl.
*H02J 3/16* (2006.01)
*H02P 9/00* (2006.01)
(Continued)

(52) U.S. Cl.
CPC ............... *H02J 3/16* (2013.01); *H02P 9/006* (2013.01); *H02P 9/105* (2013.01); *H02P 2103/20* (2015.01)

(58) Field of Classification Search
CPC .............. H02J 3/16; H02P 9/006; H02P 9/105
See application file for complete search history.

(56) References Cited

U.S. PATENT DOCUMENTS 7,400,052 B1 * 7/2008 Badger ............... H02J 15/00
290/1 A
7,642,664 B1 * 1/2010 Andrews ............. H02J 3/30
290/1 A
(Continued)

FOREIGN PATENT DOCUMENTS

CN    103580569 A    2/2014
CN    105871269 A    8/2016
(Continued)

OTHER PUBLICATIONS

WIPO, Chinese International Search Authority, International Search Report and Written Opinion dated Jul. 9, 2018 in International Patent Application No. PCT/CN2018/084026, 8 pages.

*Primary Examiner* — Viet P Nguyen
(74) *Attorney, Agent, or Firm* — Masuvalley & Partners

(57) ABSTRACT

A novel reactive power overexcitation regulation technology for synchronous generator, comprises measuring a stator voltage, a stator current, an active power and a reactive power of the synchronous generator; calculating the allowable upper limit value of the reactive power of the generator according to the allowable stator current of stator heating, and calculating the allowable value of the reactive power of the minimum stator current of the generator according to the contact reactance between the generator and the grid; comparing the stator current with its allowable value, calculate the excess calorific value of the stator of the generator if the calculated actual stator current is larger than its allowable value, enter reactive power overexcitation limiting regulation mode if the excess calorific value of the generator reaches the upper limit of the allowable heating margin of the generator; and using the larger value between the allowable upper limit value of the reactive power and the allowable value of the reactive power as the goal value of the reactive power regulation to maintain the output reactive power of the generator equal to the goal value. The present invention can protect the safety of the generator, and is beneficial to support the grid voltage to improve the stability of the power system performance.

3 Claims, 3 Drawing Sheets

(51) Int. Cl.
*H02P 9/10* (2006.01)
*H02P 103/20* (2016.01)

(56) References Cited

U.S. PATENT DOCUMENTS

| | | | |
|---|---|---|---|
| 7,750,518 B1 * | 7/2010 | Perkins | F16C 25/08 |
| | | | 310/89 |
| 2003/0146731 A1 * | 8/2003 | Berggren | H02J 3/1885 |
| | | | 318/708 |
| 2008/0052059 A1 | 2/2008 | Kim et al. | |

FOREIGN PATENT DOCUMENTS

| | | |
|---|---|---|
| CN | 106160607 A | 11/2016 |
| CN | 106788019 A | 5/2017 |

* cited by examiner

# REACTIVE POWER OVEREXCITATION REGULATION TECHNOLOGY FOR SYNCHRONOUS GENERATOR

RELATED APPLICATIONS

This application is the U.S. National Phase of and claims priority to International Patent Application No. PCT/CN2018/084026, International Filing Date Apr. 23, 2018, entitled Novel Reactive Power Overexcitation Regulation Technology For Synchronous Generator, which claims benefit of Chinese Application No. 201710130467.1 filed Mar. 7, 2017; both of which are incorporated herein by reference in their entireties.

TECHNICAL FIELD

The present invention relates to the field of generator excitation, and in particular, to a novel reactive power overexcitation regulation technology for synchronous generator.

BACKGROUND

A synchronous generator consists of two windings, which are an armature winding and a magnetic field winding. The armature winding is normally a 3-phase AC static winding, so it is also called a stator winding, and the magnetic field winding is normally a DC rotating winding, which is also known as a rotor winding. The DC current flowing through the rotor winding is also called the rotor current, the rotor current produces a magnetic field that rotates with the rotor in the rotor winding, the rotating magnetic field cuts the stator winding to induce the stator voltage, after being connected to the grid, the generator delivers the active power to the grid through the stator, exchanges reactive power with the grid at the same time, and flows current through the stator winding, which is called stator current. When the synchronous generator is running, the active power is determined by the mechanical power input by the prime mover, and the reactive power is regulated by the rotor current output from the excitation system, wherein the reactive power will cause the stator current to increase, and cause the internal loss of the generator to increase, which will cause the internal temperature of the stator to rise. Since the heat is in an extremely inverse time relationship with the stator current, the larger the stator current is, the faster the stator winding temperature rises, and the shorter the running time of the stator current can be allowed. If the overcurrent level of the generator stator winding cannot be controlled in real time and accurately, when the stator temperature exceeds the allowable upper temperature limit of the stator, the generator stator will be overheated and damaged, resulting in huge direct economic loss and indirect economic loss.

Since the active power has nothing to do with the excitation regulation, in the generator operation, the excitation system mainly controls the generator stator current by adjusting the reactive power of the generator to ensure the safe operation of the generator stator. The generator excitation system is a general term for all equipment that supplies and regulates the magnetic field current. At present, the generator excitation system is generally equipped with the functions of stator overcurrent limiting and reactive power overexcitation limiting, wherein the process of the stator overcurrent limiting is as follows that the excitation regulator compares the stator current measured in real time with the predetermined stator overcurrent limit setting value, when the actual stator current and heat generation are greater than the limit setting value, the stator overcurrent limiting function is activated, if the reactive power of the generator is greater than 0, reduces the magnetic field current, or if the reactive power of the generator is less than 0, increases the magnetic field current of the synchronous generator to achieve the goal of adjusting the generator stator current; the process of the reactive power overexcitation limiting is as follows that the excitation regulator compares the reactive power of the generator measured in real time with the predetermined reactive power overexcitation limit setting value, when the reactive power is greater than the limit setting value, the reactive power overexcitation limiting function is activated after a fixed time delay (usually 20 seconds), adjusts the reactive power back to the limit setting value to ensure that the generator operates within the predetermined reactive power range.

The function of reactive power overexcitation limiting configured in the above excitation system has been too simplified by the fact that the setting of the reactive power overexcitation limit value is relatively simple, which is mainly determined according to the reactive power range of the generator during operation, and that when the reactive power exceeds the limit setting value, the regulation is simply activated after a delay to adjust the reactive power of the generator back to the limit setting value. The excitation regulation of the generator is very important to stabilize the performance of the grid when the generator is connected to the grid, it is therefor necessary to give full play to the stable support capacity of the generator to the power grid on the basis of ensuring the safety of the generator. The reactive power range and time of the generator are related to the heating of the armature winding of the generator, and are also related to the operation of the grid, in addition the reactive power limit violation and the allowable operating time should also be related to the reactive power. At present, the reactive power limiting only serves to inform the operating personnel of the excessive reactive power.

The function of stator overcurrent limiting can work normally under normal operating conditions of the generator and the grid (the voltage is at the rated value, and the active power does not exceed the rated value), the reason for the increase of the stator current is mainly due to the magnetic field current limit violation (too large or too small), at this time, the goal of regulating the stator current to the limit setting value can be achieved by regulating the magnetic field current. However, in some special operating conditions, such as low voltage caused by the grid faults, or large active power caused by the generator governor faults, after the function of the stator overcurrent limiting is activated, the stator current cannot be regulated to a predetermined goal, and the magnetic field current, reactive power, and stator voltage may oscillate greatly during the regulating process. Based on engineering experience, some technicians have noticed that this phenomenon will occur when the reactive power of the synchronous generator is small, in most generator excitation systems, the reactive power is therefore added as a condition to the stator overcurrent limiting function of the synchronous generator, when the reactive power is greater than a certain threshold, the stator overcurrent limiting of the synchronous generator is activated. However, there are operation practice proves that increasing the reactive power condition cannot solve the above phenomenon in essence.

In summary, the inventors are committed to researching and improving the reactive power overexcitation limit regulating function of the generator, solving the startup logic and the regulating goal of the reactive power overexcitation limiting function, and solving the phenomenon and problem that the field current, the reactive power, and the armature voltage oscillate greatly when the stator current is limited to a specific operating condition. The problems that need to be solved can be summarized as the following.

(I) Researching the problem of determining the allowable value of reactive power in actual operation, and researching the essential cause of the phenomenon and problem that the stator overcurrent limiting starts the field current, the reactive power, and the armature voltage to oscillate greatly;

(II) Developing targeted technologies and methods to ensure that the reactive power output of synchronous generator is not only beneficial to reduce generator stator heating to protect generator safety, but also beneficial to support the grid voltage to improve the stability of the power system performance under any operating conditions, and solving, at the same time, the problem that the stator overcurrent limiting starts the field current, the reactive power, and the armature voltage to oscillate greatly under certain operating conditions;

(III) Developing practical technical solutions, and proposing a realization method and an action model of a novel reactive power overexcitation limiting regulation technology for generator.

SUMMARY

It is an object of the present invention to provide a novel reactive power overexcitation regulation technology for generator that ensures that the generator excitation system can reasonably activate the reactive power limiting function under any operating conditions, which is not only beneficial to regulate the armature current within the allowable heating range of the generator to protect the safe operation of the generator, at the same time to support the grid voltage to improve the stability of the power system performance.

In order to achieve the above object, the solution of the present invention includes:

A novel reactive power limiting method, wherein firstly calculating the reactive power upper limit value for the long-term operation of the generator stator heating and the reactive power allowed by the minimum stator current according to the active power, reactive power, stator voltage, stator current of the generator and the contact reactance between the generator and the grid.

$$\begin{cases} Q_{G1}(U_t, P_e) = \sqrt{U_t^2 i_{tlim}^2 - P_e^2} \\ Q_{G2}(U_t, P_e) = \frac{U_t^2}{2X_E} \sqrt{\frac{U_t^4}{4X_E^2} - P_e^2} \end{cases}$$

wherein, $i_{tlim}$ is an allowable value of the stator current, $X_E$ is a contact reactance between the generator and the grid, $P_e$ is an active power, $U_t$ is a stator voltage, $Q_{G1}$ is an allowable upper limit value of the reactive power calculated according to the allowable stator heating, and $Q_{G2}$ is an allowable value of the reactive power calculated according to the minimum stator current.

Comparing the measured stator current with the stator current setting value allowed by the generator stator heating, when the measured stator current is greater than the setting value, the calorific value of the generator is calculated as follows:

$$\begin{cases} i_t^2 = \frac{P_e^2 + Q_t^2}{U_t^2} \\ i_t > i_{tth} \\ C_t = \int (i_t^2 - i_{tn}^2) dt \\ C_t > C_a \end{cases}$$

wherein, $i_{tn}$ is a stator current rating, $i_{tth}$ is a start value of stator heating calculation, $C_t$ is a calculated value of stator heat capacity, $C_a$ is an allowable pre-setting value of stator heating, $P_e$ is an active power, $U_t$ is a stator voltage, and $I_t$ is a stator current.

When the calorific value of the generator reaches the allowable upper limit, the generator reactive power overexcitation limiting function is activated, and the excitation regulation is switched to the generator reactive power regulation, the measurement of the regulation uses reactive power, and the goal value of the reactive power regulation is the maximum value between the allowable reactive power upper limit value of the stator heating allowable calculation and the allowable reactive power value calculated according to the minimum stator current, that is:

$$Q_G(U_t, P_e) = \max\{Q_{G1}(U_t, Q_{G2}(U_t, P_e)\}$$

wherein, $Q_{G1}$ is an allowable upper limit value of the reactive power calculated according to the allowable stator heating, $Q_{G2}$ is an allowable value of the reactive power calculated according to the minimum stator current, and $Q_G$ is a goal value of the reactive power overexcitation regulation.

The invention has the beneficial effect that the present invention essentially unifies the reactive power overexcitation limiting and the stator overcurrent limiting compared with the functions of the conventional reactive power overexcitation limiting and the stator overcurrent limiting, takes the heating of the stator winding as the essential reason for the limitation of reactive power, converts the stator current regulation mode in the stator overcurrent limiting into the reactive power regulation, and clarifies that the relationship between the reactive power and the stator current of the generator is related to the active power, the stator voltage of the generator and the contact reactance between the generator and the grid. The invention not only solves the problem of the allowable range of reactive power, but also solves the problem that the stator current, the reactive power and the stator voltage oscillate greatly caused by that the stator overcurrent limitation enters the ineffective regulation zone, that is not only beneficial to stabilize the stator current within the allowable heating range of the generator to protect the safe operation of the generator, at the same time to support the grid voltage to improve the stability of the power system performance.

DESCRIPTION OF EMBODIMENTS

After the generator is connected to the grid, power exchange occurs between the generator and the grid, which generates stator current. The stator current has two functions, on the one hand, it provides sufficient torque between the stator winding and the rotor winding to maintain the synchronous operation of the generator and the grid, and converts the mechanical energy input from the generator shaft end into electric power output; on the other hand, it also sends reactive power to the grid or absorbs reactive power, which together with the rotor current forms the internal magnetic field of the generator. There are two factors that affect the reactive power of the generator, on the one hand, if the amplitude of the reactive power generated by the generator is too large, the stator current will increase, that will cause the stator winding of the generator to heat up, and the temperature will rise, where the temperature of the stator winding will determine the boundary of the stator current and the reactive power of the generator; on the other hand, the generator generates reactive power, one of which compensates for the reactive power loss of the contact reactance between the generator and the grid, and the other is the exchange of reactive power between the generator and the grid, since the grid voltage is constant, when the active power is constant, the reactive power exchange capacity determines the current of the generator and the grid, when the generator is in normal operation, the active power is generally large, when the stator winding fault occurs, the faulty stator current is mainly determined by the active power, at this time, limiting the reactive power has a limited effect on the faulty stator current, and the fault stator current value cannot be controlled by regulating the excitation, when the stator winding is faulty, the generator relay protection is quickly operated to stop the shutdown to reduce the degree of fault damage, the function of the generator reactive power limiting is therefore mainly for the magnitude of the reactive power exchanged between the generator and the grid under normal conditions. During the operation of the generator and the excitation system, the stator current and reactive power of the generator are detected in real time, and the reactive power of the generator is regulated in real time according to the operating range of the stator current, there are two principles for determining the reactive power overexcitation operating boundary of the generator: stator winding overheat limit and minimum stator current limit.

Figure 4:
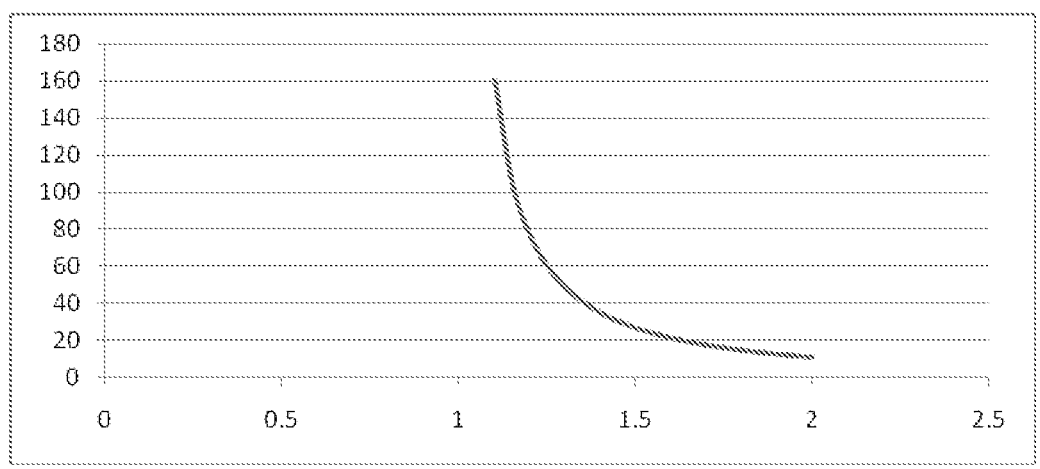
FIG. 4 is a schematic diagram showing the relationship between the reactive power overexcitation operation time of the generator and the stator current.
Figure 5:
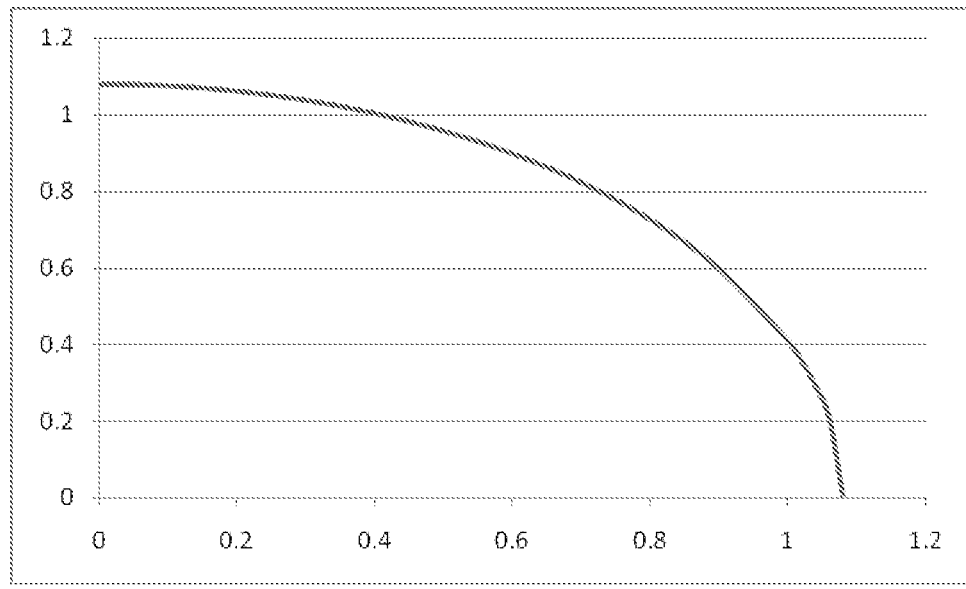
FIG. 5 is a schematic diagram showing the relationship between the allowable upper limit of reactive power of the generator heating and the active power.

The stator winding of the generator is embedded in the stator core, and its operating temperature cannot exceed a certain limit, otherwise the stator winding will be overheated and damaged. It is reasonable to measure the stator winding temperature since the stator overcurrent of the generator is directly determined by the stator winding temperature of the generator, however, in practical engineering applications, due to the large volume of the stator winding core of the generator, the numerous temperature measuring points, and the different temperatures at different points, it is difficult to realize the physical quantity based on the stator winding temperature as the stator current limit. On the other hand, the stator winding temperature of the generator rise mainly comes from the heat generated by the current flowing through the stator in the stator winding, which is proportional to the stator current squared and proportional to the stator winding resistance and operating time, and the stator winding temperature rise is proportional to the heat, in fact, as shown in FIG. 4, the heating of the stator is to calculate the holding time of the stator current, that is, the reactive power overexcitation operating time, and the operating time and the stator current have extremely inverse time characteristics. In addition, the generator reactive power limit must ensure that the stator winding of the generator does not suffer from overtemperature damage, and also to support the grid voltage. In order to give full play to the heating margin of the stator winding of the generator to ensure the support of the grid voltage, it requires that the generator maintains the output reactive power after the reactive power overexcitation limiting is activated, the generator stator winding will not overheat and damage as long as the stator current of the generator is not lower than the allowable stator current of the generator, it is not advisable to reduce the reactive power excessively to maintain the generator's ability to support the grid voltage, the reactive power and the active power are circular property, as shown in FIG. 5, the radius of the circular property is related to the stator current setting allowed by the generator stator heating.

Figure 6:
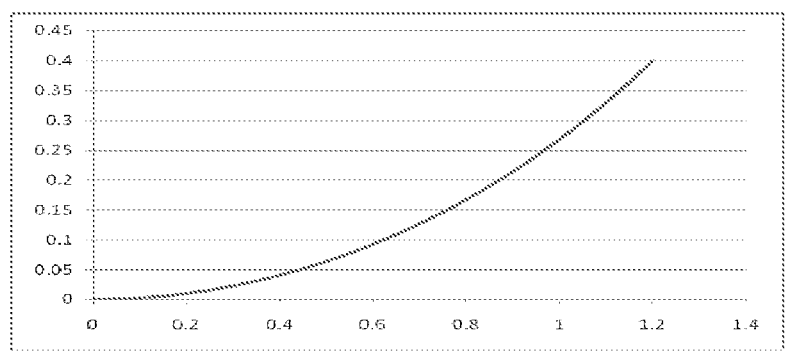
FIG. 6 is a schematic diagram showing the relationship between the allowable reactive power value of the minimum stator current of the generator and the active power.

Under normal circumstances, the generator is equivalent to a unit connected to the contact reactance and the infinite bus (voltage remains unchanged), as can be seen from the foregoing, the active power is independent of the excitation regulation, and the current between the generator and the grid (stator current) is only related to the reactive power exchanged between the generator and the grid, when the reactive power exchanged is 0, the stator current is minimum, at this time, the generator must emit reactive power, and the reactive power generated is equal to the reactive power lost by the contact reactance. As we known that the reactive power lost by the contact reactance is the product of the reactance value and the square of the current flowing through the reactance, in this way, we can confirm that the reactive power value of generator is determined by the minimum stator current, and as shown in FIG. 6, this reactive power is related to the active power, stator voltage and contact reactance, and increases with the increase of the active power, this is an important difference from the previous recognition that "the stator current is minimum when the reactive power of the generator is 0". Under normal conditions, the minimum stator current is generally not less than the allowable stator current of the stator heating of the generator, however, when a voltage grid fault causes a low voltage or the generator governor fails, resulting in an active power exceeding the rated value, the minimum stator current is greater than the allowable stator current of the stator heating of the generator, at this time, no matter how to regulate the output current of the excitation system, the stator current of the generator cannot reach the goal of the allowable stator current of the stator heating, that is, enter the ineffective regulation zone of the stator current limit, and the phenomenon that the stator current, the excitation current, the stator voltage and the reactive power oscillate greatly will occur if the stator current regulation is not stopped. Judging whether the stator current regulation is in the ineffective regulation zone timely and maintaining the stator current at the minimum by regulating the reactive power, which not only minimizes the heat generation of the generator that is most beneficial to the operation of the generator, but also maintains a high reactive power output that is beneficial to the voltage support of the generator to the power grid.

In summary, the novel reactive power overexcitation regulation technology takes the heating time of the stator current of the generator as the basis for activating the overexcitation limiting, solves the problem that the fixed value of the reactive power overexcitation limiting is unreasonable, unifies the reactive power overexcitation limiting and the stator overcurrent limiting organically, and judges the phenomenon of the ineffective regulation zone timely by calculating the minimum value of the stator current exchanged by the generator-grid, thereby solving the problem that the stator current, the reactive power and the stator voltage of the generator oscillate greatly caused by the stator current limitation in the ineffective regulation zone. The reactive power overexcitation limit starting value studied by the present invention is calculated as follows:

$$\begin{cases} i_t^2 = \frac{P_e^2 + Q_t^2}{U_t^2} \\ i_t > i_{tth} \\ C_t = \int (i_t^2 - i_{tn}^2) dt \\ C_t > C_a \end{cases}$$

wherein, $i_{tn}$ is a stator current rating, $i_{tth}$ is a start threshold of stator heating calculation, $C_t$ is a calculated value of stator heat capacity, $C_a$ is an allowable pre-setting value of stator heating, $P_e$ is an active power, $U_t$ is a stator voltage, and $I_t$ is a stator current. The regulation goal of the reactive power overexcitation limiting start is calculated as follows:

$$\begin{cases} Q_{G1}(U_t, P_e) = \sqrt{U_t^2 i_{tlim}^2 - P_e^2} \\ Q_{G2}(U_t, P_e) = \frac{U_t^2}{2X_E} \sqrt{\frac{U_t^4}{4X_E^2} - P_e^2} \\ Q_G(U_t, P_e) = \max\{Q_{G1}(U_t, P_e), Q_{G2}(U_t, P_e)\} \end{cases}$$

wherein, $i_{tlim}$ is an allowable value of the stator current, $X_E$ is a contact reactance between the generator and the grid, $P_e$ is an active power, $U_t$ is a stator voltage, $Q_{G1}$ is an allowable upper limit value of the reactive power calculated according to the allowable stator current, $Q_{G2}$ is an allowable value of the reactive power calculated according to the minimum stator current, and $Q_G$ is a goal value of the reactive power overexcitation regulation.

The technical solution of the present invention will be described in detail below with reference to the figures.

Figure 1:
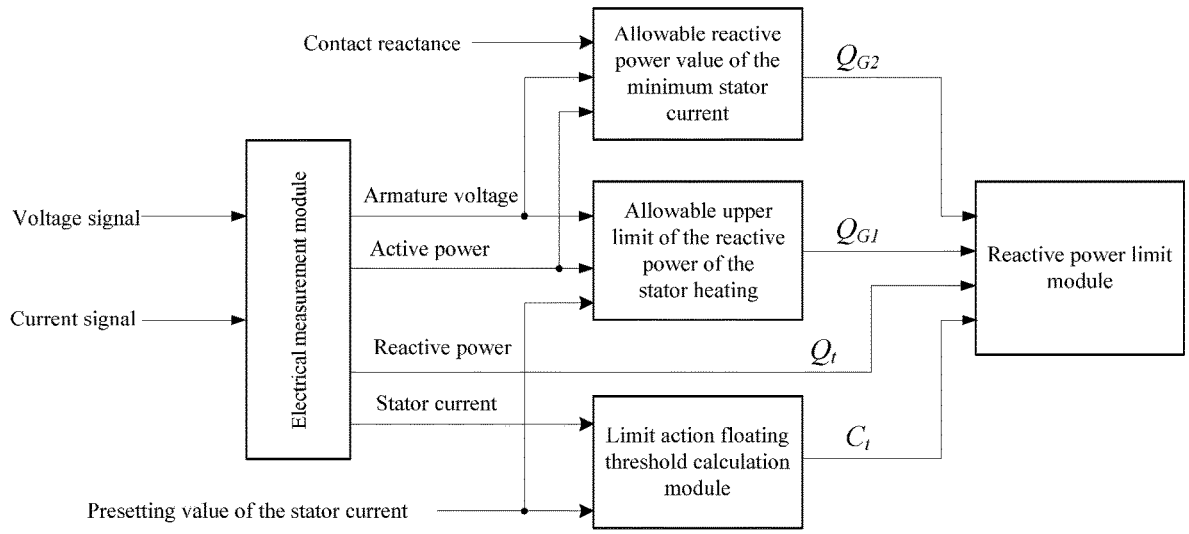
FIG. 1 is a schematic diagram of the module of the present invention.

As shown in FIG. 1, the invention provides a reactive power overexcitation regulation technology for generator, which comprises an electrical measurement module, an allowable upper limit value of the reactive power calculation module, an allowable reactive power value of the minimum stator current calculation module and a limit start logic calculation module, wherein the electrical measurement module calculates the value of the stator voltage, the stator current, the active power and the reactive power of the generator based on the input voltage signal and current signal of the generator, and calculates the allowable upper limit value of the reactive power based on the active power, the stator voltage, and the allowable value of the stator current for a long-term operation of the generator.

$$Q_{G1}(U_t, P_e) = \sqrt{U_t^2 i_{tlim}^2 - P_e^2}$$

wherein, $i_{tlim}$ is an allowable value of the stator current for a long-term operation, $P_e$ is an active power, $U_t$ is a stator voltage.

Calculating the allowable reactive power value of the minimum stator current based on the active power, the stator voltage of the generator, and the contact reactance between the generator and the grid.

$$Q_{G2}(U_t, P_e) = \frac{U_t^2}{2X_E} \sqrt{\frac{U_t^4}{4X_E^2} - P_e^2}$$

wherein, $X_E$ is a contact reactance between the generator and the grid, $P_e$ is an active power, $U_t$ is a stator voltage.

Calculating the calorific value of the stator of the generator based on the stator current, the stator current rating and the start value of heating calculation of the generator.

$$\begin{cases} i_t > i_{tth} \\ C_t = \int (i_t^2 - i_{tn}^2) dt \end{cases}$$

wherein, $i_{tn}$ is a stator current rating, $i_{tth}$ is a start value of stator heating calculation, $C_t$ is a calculated value of stator heat capacity.

Figure 2:
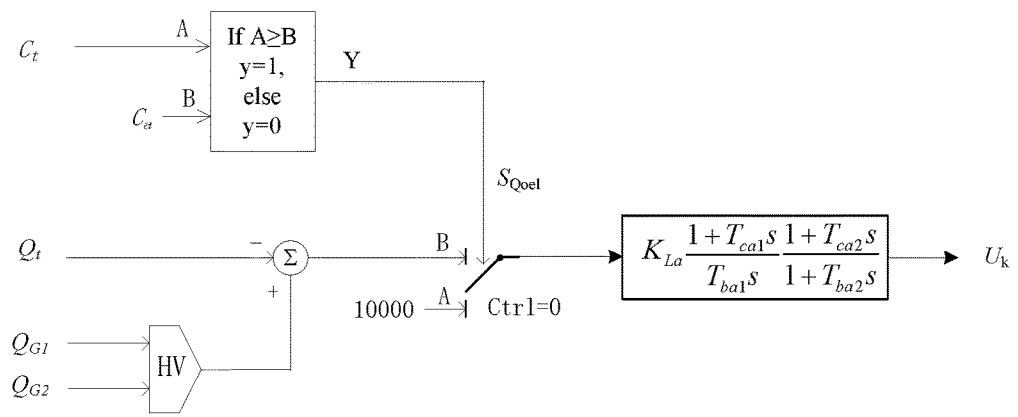
FIG. 2 is a schematic diagram of the operation of the present invention.
Figure 3:
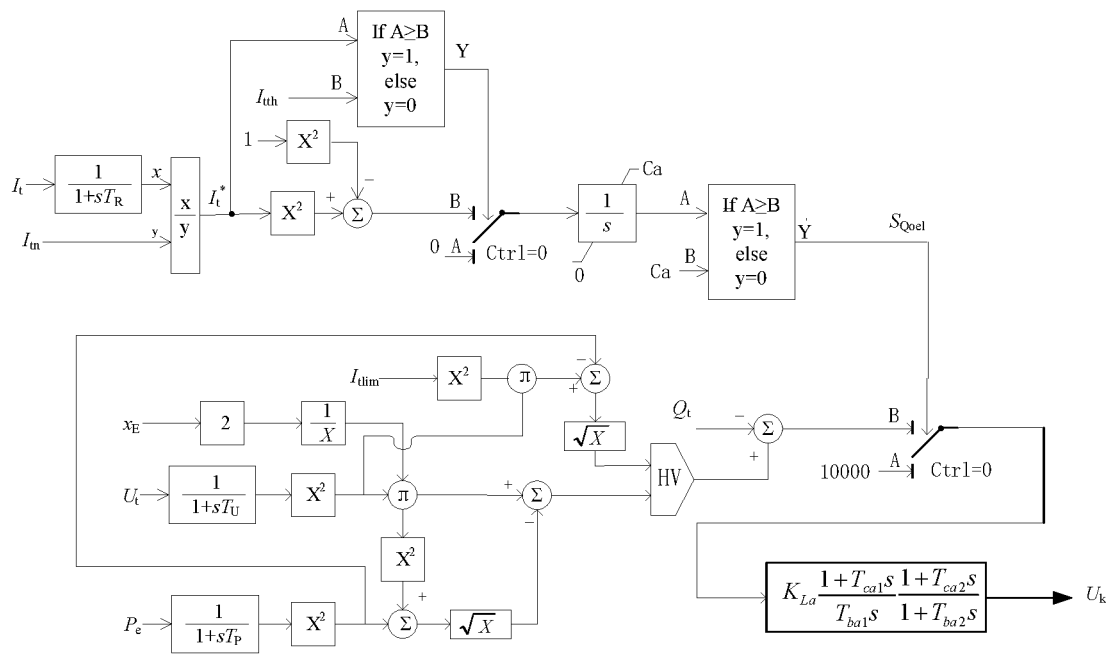
FIG. 3 is a general diagram of the function of the present invention.

A schematic diagram of the operation of a novel reactive power overexcitation limiting for generator disclosed in the present invention as shown in FIG. 2, wherein $Q_t$ is a reactive power of the generator, $Q_{G1}$ is an allowable upper limit value of the reactive power calculated according to the long-term allowable stator current, $Q_{G2}$ is an allowable value of the reactive power calculated according to the minimum stator current, $C_t$ is a calculated value of stator heating, $C_a$ is an allowable value of stator heating, $S_{Qoe1}$ is a reactive power overexcitation limiting signal, and $K_{La}$, $T_{ca1}$, $T_{ba1}$, $T_{ca2}$ and $T_{ba2}$ are a gain coefficient of the series PID adjustment link, integral time constants and differential time constants respectively.

The working principle of the operation of the novel reactive power overexcitation limiting is as follows. Comparing the calculated actual calorific value $C_t$ of the stator of the generator with the allowable calorific value $C_a$ of the stator of the generator, sending the reactive power overexcitation limiting signal $S_{Qoe1}$ if the calculated actual calorific value $C_t$ of the stator of the generator is larger than the allowable calorific value $C_a$ of the stator of the generator.

The working principle of the novel reactive power overexcitation limiting regulation is as follows. Comparing the allowable upper limit value $Q_{G1}$ of the reactive power calculated according to the long-term allowable stator current with the allowable value $Q_{G2}$ of the reactive power calculated according to the minimum stator current, using the larger of the two as the goal value $Q_G$ of the reactive power, outputting the difference between the measured reactive power $Q_t$ and goal value $Q_G$ of the reactive power to the series PID adjustment link when $S_{Qoe1}$ is set to 1, maintaining the reactive power $Q_t$ of the generator is equal to the goal value $Q_G$ of the reactive power by the function of the series PID adjustment link to maintain stable operation of the reactive power of the generator, that is not only beneficial to stabilize the stator current within the allowable heating range of the generator to protect the safe operation of the generator, at the same time to support the grid voltage to improve the stability of the power system performance.

The above embodiments are merely illustrative of the technical idea of the present invention, and the scope of protection of the present invention cannot be limited thereto, any technical changes made in accordance with the present invention or based on the technical solutions should fall within the scope of protection of the present invention.

What is claimed is:

1. A novel reactive power overexcitation regulation technology for synchronous generator, wherein, comprising:

measuring a stator voltage, a stator current, an active power and a reactive power of the synchronous generator;

calculating the allowable upper limit value of the reactive power of the generator according to the allowable stator current of stator heating of the generator, and calculating the allowable value of the reactive power of the minimum stator current of the generator according to the contact reactance between the generator and the grid;

comparing the calculated actual stator current with its allowable value, calculate the excess calorific value of the stator of the generator if the calculated actual stator current is larger than its allowable value, enter reactive power overexcitation limiting regulation mode if the excess calorific value of the generator reaches the upper limit of the allowable heating margin of the generator;

using the larger value between the allowable upper limit value of the reactive power and the allowable value of the reactive power of the minimum stator current as the goal value of the reactive power regulation to maintain the output reactive power of the generator equal to the goal value.

2. The novel reactive power overexcitation regulation technology for synchronous generator according to claim 1, wherein the goal value of the reactive power regulation is calculated as:

$$\begin{cases} Q_{G1}(U_t, P_e) = \sqrt{U_t^2 i_{tlim}^2 - P_e^2} \\ Q_{G2}(U_t, P_e) = \frac{U_t^2}{2X_E}\sqrt{\frac{U_t^4}{4X_E^2} - P_e^2} \\ Q_G(U_t, P_e) = \max\{Q_{G1}(U_t, P_e), Q_{G2}(U_t, P_e)\} \end{cases}$$

wherein, $i_{tlim}$ is an allowable value of the stator current, $X_E$ is a contact reactance between the generator and the grid, $P_e$ is an active power, $U_t$ is a stator voltage, $Q_{G1}$ is an allowable upper limit value of the reactive power calculated according to the allowable stator heating, $Q_{G2}$ is an allowable value of the reactive power calculated according to the minimum stator current, and $Q_G$ is a goal value of the reactive power overexcitation regulation.

3. The novel reactive power overexcitation regulation technology for synchronous generator according to claim 2, wherein the startup logic is calculated as:

$$\begin{cases} i_t^2 = \frac{P_e^2 + Q_t^2}{U_t^2} \\ i_t > i_{tth} \\ C_t = \int (i_t^2 - i_{tn}^2) dt \\ C_t > C_a \end{cases}$$

wherein, $i_{tn}$ is a stator current rating, $i_{tth}$ is a start threshold of stator heating calculation, $C_t$ is a calculated value of stator heat capacity, $C_a$ is an allowable pre-setting value of stator heating, $P_e$ is an active power, $U_t$ is a stator voltage, and $I_t$ is a stator current.

* * * * *

UNITED STATES PATENT AND TRADEMARK OFFICE
CERTIFICATE OF CORRECTION

PATENT NO. : 10,535,997 B2
APPLICATION NO. : 16/469607
DATED : January 14, 2020
INVENTOR(S) : Long Wu, Weiqun Liu and Xiangjian Shi Page 1 of 1

It is certified that error appears in the above-identified patent and that said Letters Patent is hereby corrected as shown below:

In the Claims

In Column 10, Line 11, change "item" to -- $i_{tlim}$ --.

Signed and Sealed this
Twenty-seventh Day of October, 2020

Andrei Iancu
*Director of the United States Patent and Trademark Office*